United States Patent
Granger

(10) Patent No.: US 10,724,506 B2
(45) Date of Patent: Jul. 28, 2020

(54) OSCILLATORY MECHANISM WITH SIMULTANEOUS CROSSED-CENTRIFUGATIONS, MACHINE AND IMPLEMENTATION METHOD

(71) Applicant: Maurice Granger, Albufeira (PT)

(72) Inventor: Maurice Granger, Albufeira (PT)

(*) Notice: Subject to any disclaimer, the term of this patent is extended or adjusted under 35 U.S.C. 154(b) by 144 days.

(21) Appl. No.: 15/919,373

(22) Filed: Mar. 13, 2018

(65) Prior Publication Data

US 2018/0283364 A1 Oct. 4, 2018

Related U.S. Application Data

(63) Continuation of application No. PCT/FR2017/052134, filed on Jul. 28, 2017, and a
(Continued)

(51) Int. Cl.
| | |
|---|---|
| *F03G 3/06* | (2006.01) |
| *F03G 7/08* | (2006.01) |
| *B06B 1/16* | (2006.01) |
| *H02K 7/06* | (2006.01) |
| *F16H 33/20* | (2006.01) |
| *B06B 1/18* | (2006.01) |

(52) U.S. Cl.
CPC .............. *F03G 3/06* (2013.01); *B06B 1/16* (2013.01); *F03G 7/08* (2013.01); *F16H 33/20* (2013.01); *H02K 7/061* (2013.01); *B06B 1/162* (2013.01); *B06B 1/183* (2013.01)

(58) Field of Classification Search
CPC ... F16H 33/20; F03G 3/06; F03G 7/08; B06B 1/16
See application file for complete search history.

(56) References Cited

U.S. PATENT DOCUMENTS

| 646,419 A | 4/1900 | Doran |
| 3,530,617 A * | 9/1970 | Halvorson ........... A63H 18/007 446/484 |

(Continued)

FOREIGN PATENT DOCUMENTS

GB 2104187 3/1983

*Primary Examiner* — David M Fenstermacher
(74) *Attorney, Agent, or Firm* — Forge IP, PLLC

(57) ABSTRACT

A mechanism with a base; a pendulum mounted pivotally relative to the base about a pendulum axis; first/second eccentric elements generating first/second moments of gravitational force about first/second axes; and a synchronization system of the first/second eccentric elements according to a synchronized counter-rotating rotational movement. The pendulum axis and eccentric elements' axes are parallel and arranged in the plane integral to the pendulum. The eccentric elements' axes are supported by the pendulum, above and below the pendulum axis. The eccentric elements are movable in synchronized counter-rotating rotation, with cross-centrifugations, the pendulum pivots alternately on one side then the other, amplifying the rotational movement of the eccentric elements, by simultaneous cross-thrusts of the pendulum against the eccentric elements' axes, and by the transmission of torque to the synchronization system, and the energy generated by centrifugation within the mechanism is recoverable by coupling an energy recovery system to the synchronization system.

15 Claims, 9 Drawing Sheets

Related U.S. Application Data continuation of application No. PCT/FR2017/050704, filed on Mar. 28, 2017.

(56) References Cited

U.S. PATENT DOCUMENTS

| | | | | |
|---|---|---|---|---|
| 4,241,615 | A | | 12/1980 | Ryan |
| 4,285,405 | A | | 8/1981 | Weir, Jr. |
| 4,424,718 | A | | 1/1984 | Wadensten |
| 4,712,439 | A | * | 12/1987 | North .................. F03G 3/00 74/61 |
| 4,856,358 | A | * | 8/1989 | Montalbano ............ B06B 1/167 74/84 R |
| 5,042,313 | A | | 8/1991 | Montalbano |
| 5,388,470 | A | * | 2/1995 | Marsh, Jr. ................. F03G 3/00 173/49 |
| 6,139,218 | A | * | 10/2000 | Cochran .................... B06B 1/16 404/113 |
| 7,124,840 | B2 | * | 10/2006 | Miyakawa ............. B25D 17/24 173/162.1 |
| 7,832,297 | B2 | * | 11/2010 | Hewatt ................. G01C 19/02 74/5.12 |
| 8,866,314 | B2 | * | 10/2014 | Linevich ................... F03G 3/00 290/1 C |
| 9,039,324 | B2 | * | 5/2015 | Ackermann .......... E01C 19/282 404/117 |
| 10,099,780 | B2 | * | 10/2018 | Welch .................. B64C 27/001 |

\* cited by examiner

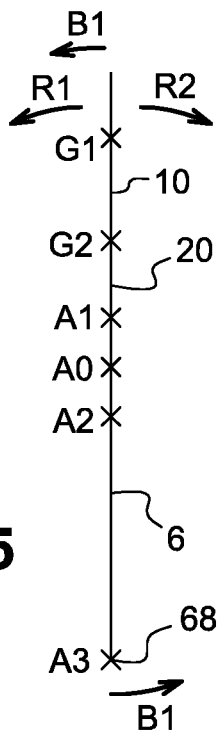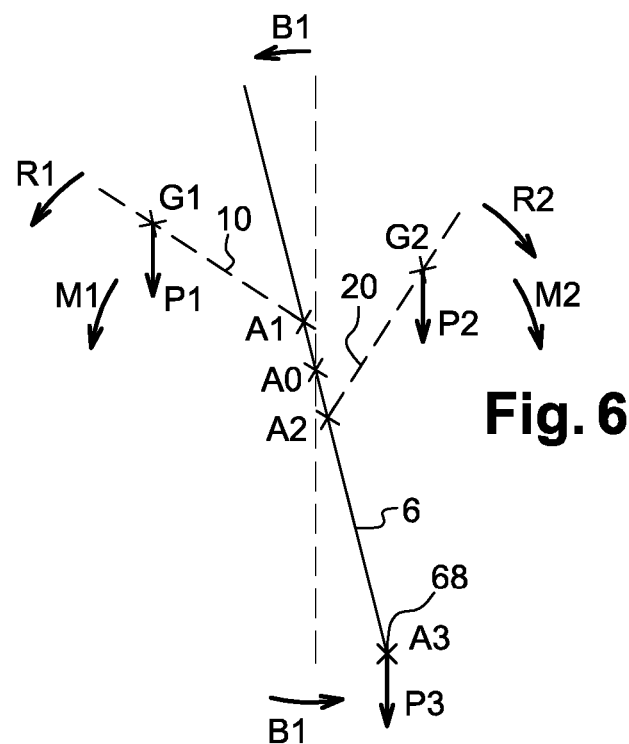
Fig. 5
Fig. 6
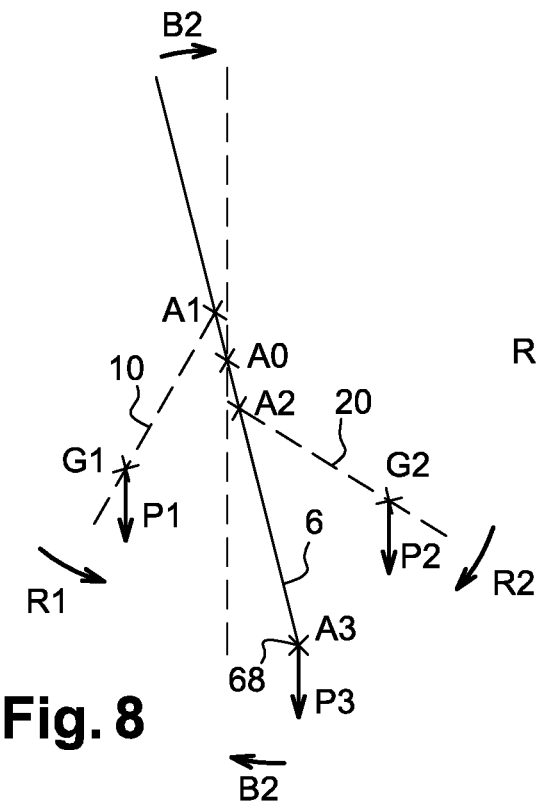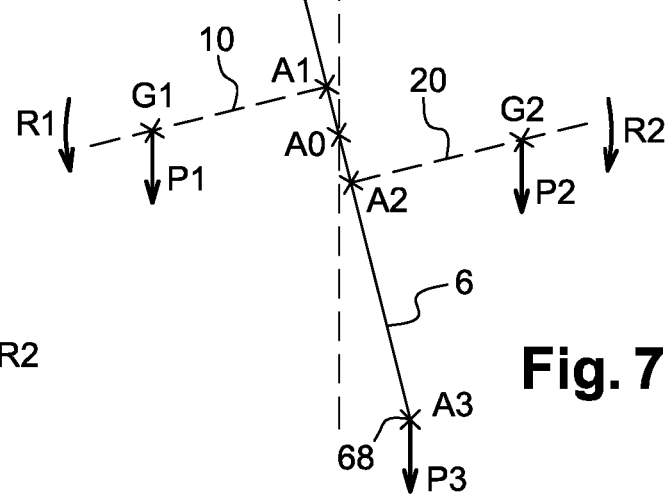
Fig. 8
Fig. 7

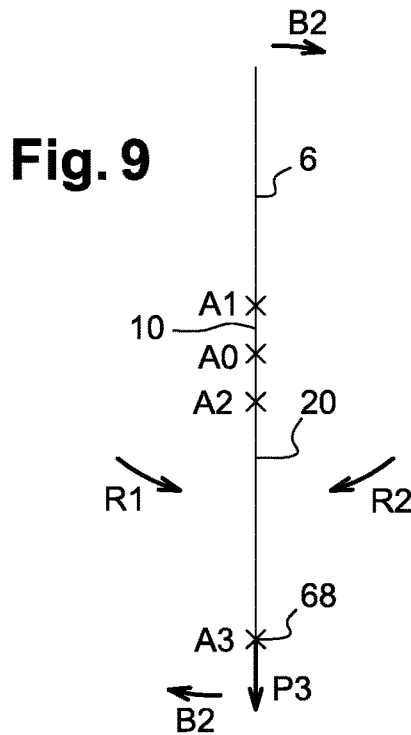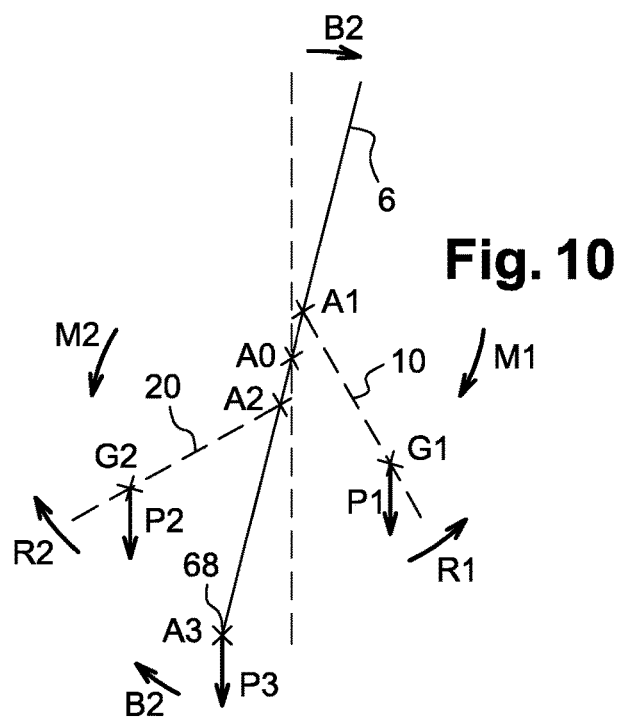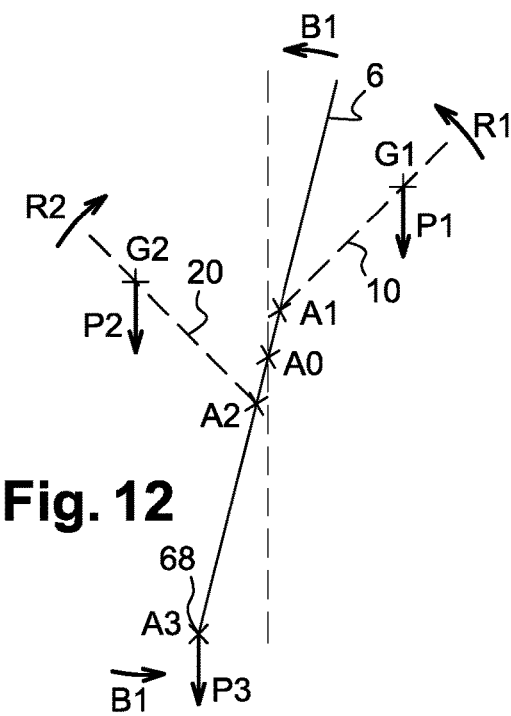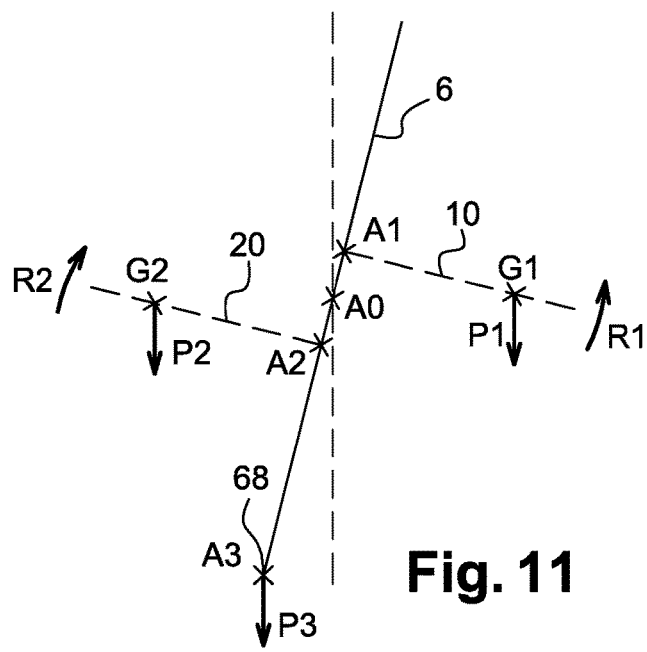
Fig. 9
Fig. 10
Fig. 11
Fig. 12

OSCILLATORY MECHANISM WITH SIMULTANEOUS CROSSED-CENTRIFUGATIONS, MACHINE AND IMPLEMENTATION METHOD

TECHNICAL FIELD OF THE INVENTION

The present invention relates to an oscillatory mechanism with simultaneous crossed-centrifugations, for recovering energy, for any conceivable application.

The invention also concerns a machine for the production of energy, or any other application, comprising at least one such a mechanism. For example, the machine may be a motor, a generator, or a blender. In particular the invention concerns an energy production machine, preferably comprising several mechanisms coupled together in parallel and/or series.

The invention also relates to a method for implementing such a mechanism.

BACKGROUND OF THE INVENTION

In the mechanical field, there are many motion transmission mechanisms, such as planetary gear trains or crankshafts, suitable for equipping machines for the production of energy or any other application. The yields obtained with known mechanisms are not however entirely satisfactory.

The Applicant has developed several energy recovery mechanisms, such as the balanced mechanism described in the application WO2017064379.

SUMMARY OF THE INVENTION

The purpose of the present invention is to propose new mechanisms that enable to recover energy and to improve the performance of a machine.

For this purpose, the object of the invention is a mechanism, comprising: a base; a pendulum mounted pivotally in relation to the base about a pendulum axis; a first eccentric element generating a first moment of gravitational force around a first axis; a second eccentric element generating a second moment of gravitational force about a second axis; and a synchronization system for synchronizing the first eccentric element and the second eccentric element according to a synchronized counter-rotating rotational movement; wherein: the pendulum axis and the axes of the eccentric elements are parallel and arranged in a same plane integral to the pendulum; the axes of the eccentric elements are supported by the pendulum, respectively above and below the pendulum axis; and when the mechanism is in operation:
the eccentric elements are movable in synchronized counter-rotating rotation, with cross-centrifugations,
the pendulum pivots alternately on one side then the other, amplifying the rotational movement of the eccentric elements, by means of simultaneous cross-thrusts of the pendulum against the axes of said eccentric elements, and by the transmission of torque to the synchronization system, and
the energy generated by centrifugation within the mechanism is recoverable by coupling an energy recovery system to the synchronization system.

Thus, the invention enables to generate energy, thanks to the cross-centrifugation forces resulting from the movements of the eccentric elements and the movements of the pendulum.

The centrifugal forces generated by the eccentric elements provide the energy necessary for the rotational drive thereof. The more the centrifugal forces increase, the more this rotation is facilitated.

The pivoting of the pendulum enables to multiply the centrifugal forces generated by the eccentric elements.

According to other advantageous characteristics of the mechanism according to the invention, taken in isolation or in combination:
The axes of the eccentric elements are positioned equidistant from the pendulum axis.
The counter-rotating elements have the same mass and the same dimensions.
The pendulum axis and the axes of the eccentric elements are arranged in the same vertical plane when the mechanism is at rest.
The eccentric elements have a generally increasing section, as the distance from the axis of rotation increases.
The eccentric elements are arranged such that when the mechanism is in operation, the eccentric elements intersect at a high and a low position.
The eccentric elements are arranged such that when the mechanism is in operation, the eccentric elements intersect at the left lateral position and at the right lateral position. Advantageously, the moments of force of gravity of the eccentric elements have the same value and the same direction, variable according to the angular position thereof about the axes; for each angular position of the eccentric elements about the axes, the mechanism has a balance configuration at rest.
A counterweight is attached to the lower part of the pendulum and amplifies the pivoting thereof on one side then the other, which amplifies the simultaneous cross-thrusts of the pendulum against the axes of the eccentric elements and the transmission of torque to the synchronization system.
The mechanism comprises a locking system operable between: a configuration for locking the eccentric elements in the high position, preventing them from describing the synchronized counter-rotating rotational movement, and a configuration for releasing the eccentric elements, allowing them to describe the synchronized counter-rotating rotational movement.
The locking system comprises a pivoting hook mounted on the pendulum and a hooking element integral to one of the eccentric elements.
The synchronization system comprises gearwheels mounted on the pendulum axis and the axes of the eccentric elements.
The synchronization system comprises:
a first support shaft mounted pivotally on the pendulum, centered on the first axis and integral to the first eccentric element,
a second support shaft mounted pivotally on the pendulum, centered on the second axis and integral to the second eccentric element,
a first central gearwheel and a first intermediate gearwheel integral to the first support shaft, the first central gearwheel having a diameter and number of teeth double that of the first intermediate gear,
a second central gearwheel and a second intermediate gearwheel integral to the second support shaft, the second central gear wheel meshing with the first central gearwheel, the second central gearwheel having a diameter and number of teeth equal to that of the first central gearwheel and double that of the second intermediate gearwheel, a first lateral shaft and a second lateral shaft centered on the pendulum axis, a first lateral gearwheel integral to the first lateral shaft and meshing with the first intermediate gearwheel, a second lateral gearwheel integral to the second lateral shaft and meshing with the second intermediate gearwheel, where either the first lateral shaft or the second lateral shaft is intended to be coupled to the energy recovery system.

During one 360° rotation of the eccentric elements, between two pivotings of the pendulum, the gearwheels receive the torque being captured between the thrusts of the pendulum and the rotation of the eccentric elements, the torque propelling the eccentric elements downwards, accelerating them, then upwards in opposing the forces of gravity.

The eccentric elements are in the shape of wind turbine blades.

The invention also relates to a machine, characterized in that it comprises: at least one mechanism as mentioned above, and an energy recovery system coupled to a synchronization system.

According to other advantageous characteristics of the machine according to the invention, taken in isolation or in combination:

The machine comprises at least one pair of mechanisms coupled in parallel or in series, wherein the pendulums alternately pivot in a counter rotating manner in relation to one another.

Within the pair of mechanisms, all the moving parts of a first mechanism are counter-rotating in relation to the corresponding moving parts of the other mechanism.

The pair of mechanisms comprises eccentric elements arranged in phase opposition, such that when the machine is in operation, the eccentric elements of a first mechanism intersect at a high position while the eccentric elements of a second mechanism intersect at a low position.

The pair of mechanisms comprises eccentric elements arranged in phase such that when the machine is in operation, the eccentric elements of a first mechanism intersect at a left lateral position while the eccentric elements of a second mechanism intersect at a right lateral position.

The machine is an energy production machine, for example for a motor or generator. Alternatively, the machine may be a blender, or any other type of conceivable machine.

The object of the invention is also a method for implementing a mechanism such as that described above.

The method is characterized in that it comprises:

a startup step, for imparting a synchronized counter-rotating rotational movement to the eccentric elements;

an operating step, during which:

the eccentric elements are movable in synchronized counter-rotating rotation, with cross-centrifugations, the pendulum pivots alternately on one side then the other, amplifying the rotational movement of the eccentric elements, by means of simultaneous cross-thrusts of the pendulum against the axes of said eccentric elements, and by the transmission of torque to the synchronization system, and an energy recovery system coupled to the synchronization system recovers energy generated by centrifugation within the mechanism;

if necessary during the operating step, restarting steps consisting in imparting new momentum to the eccentric elements in the synchronized counter-rotating rotational movement thereof; and in that the energy recovered by the energy recovery system during the operating step is greater than the energy expended during the startup step and the restarting steps.

According to other particular characteristics of the method according to the invention, taken in isolation or in combination:

During the operating phase, for each revolution of the eccentric elements six centrifugations are produced:

a first centrifugation, so-called vertical, due to the descent of the eccentric elements;

a second centrifugation, so-called horizontal, due to the pivoting of the pendulum on a first side, pushing against the first axis;

a third centrifugation, so-called horizontal, due to the pivoting of the pendulum on a first side, pushing against the second axis;

a fourth centrifugation, so-called vertical, due to the descent of the eccentric elements;

a fifth centrifugation, so-called horizontal, due to the pivoting of the pendulum on a second side, pushing against the first axis in the opposite direction to the second centrifugation;

a sixth centrifugation, so-called horizontal, due to the pivoting of the pendulum on a second side, pushing against this second axis in the opposite direction to the second centrifugation;

where the second and third centrifugations are simultaneous at the end of the first centrifugation and at the start of the fourth centrifugation, while the fifth and sixth centrifugations are simultaneous at the end of the fourth centrifugation and at the start of the first centrifugation.

During the operating phase, the pivoting of the pendulum increases the acceleration of the rotational movement of the eccentric elements during the descent thereof, then attenuates the deceleration of the rotational movement of the eccentric elements during the ascent thereof.

The startup step is performed by means of gravity, releasing the eccentric elements arranged at the high position.

The startup step is performed using a crank coupled to the synchronization system.

The startup step and/or the restarting steps are performed using a drive motor coupled to the synchronization system.

The startup step is performed by simply pushing against one of the eccentric elements.

The energy recovery system comprises a generator.

The energy recovery system comprises a motor-generator which is also used for the startup step and/or the restarting steps.

The eccentric elements are in the shape of wind turbine blades, wherein the windage thereof is used for the startup step and/or the restarting steps.

BRIEF DESCRIPTION OF THE DRAWINGS

The invention will be better understood upon reading the following description, given solely as a non-limiting example, and made with reference to the accompanying figures wherein:

FIGS. 5 to 12 schematically show the different operating steps of the mechanism of FIGS. 1 to 3;

DETAILED DESCRIPTION OF SOME EMBODIMENTS

Figure 1:
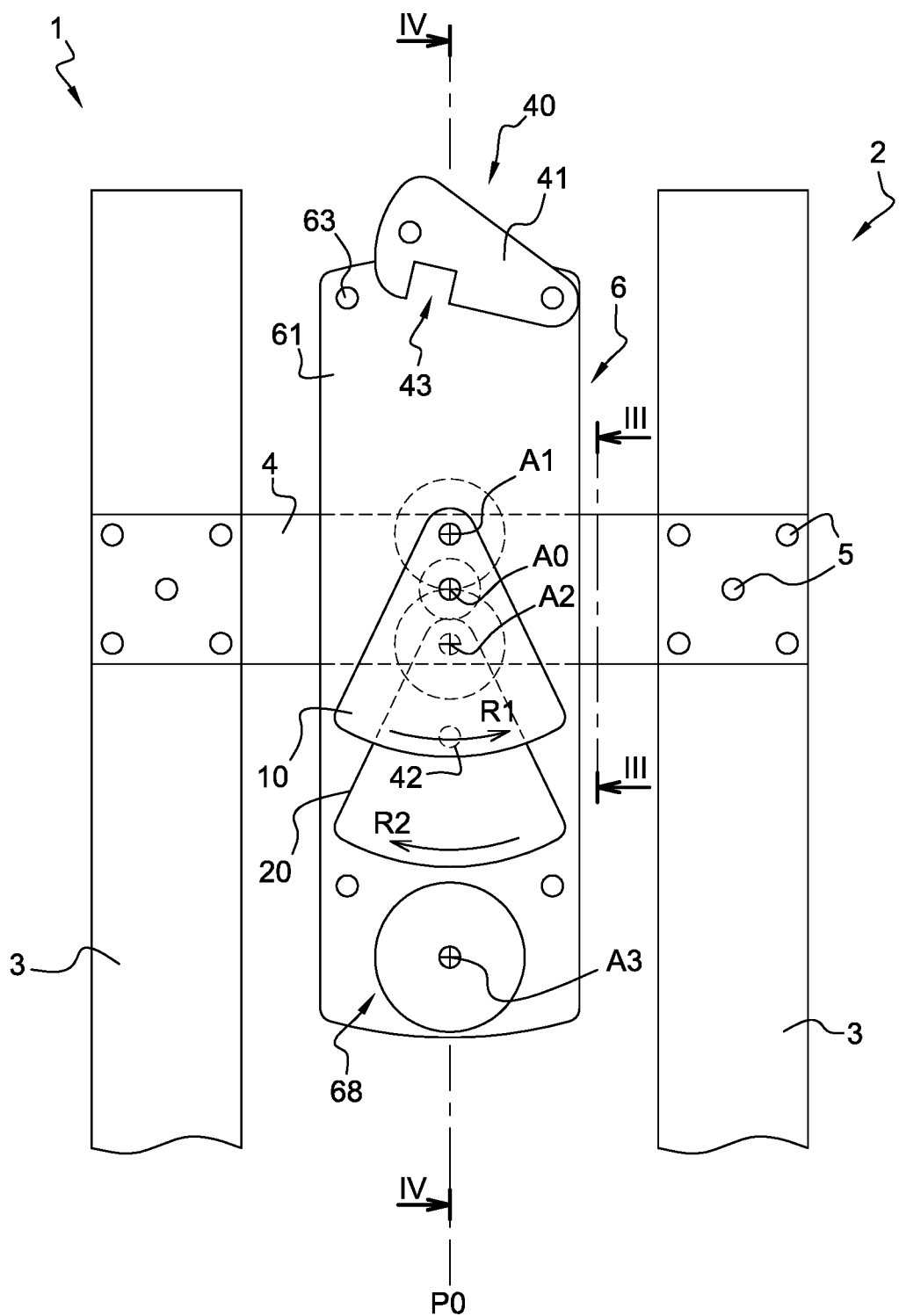
FIG. 1 is a front view of a mechanism according to the invention, comprising a base, a pendulum and two eccentric elements, which are shown in the lower position.
Figure 2:
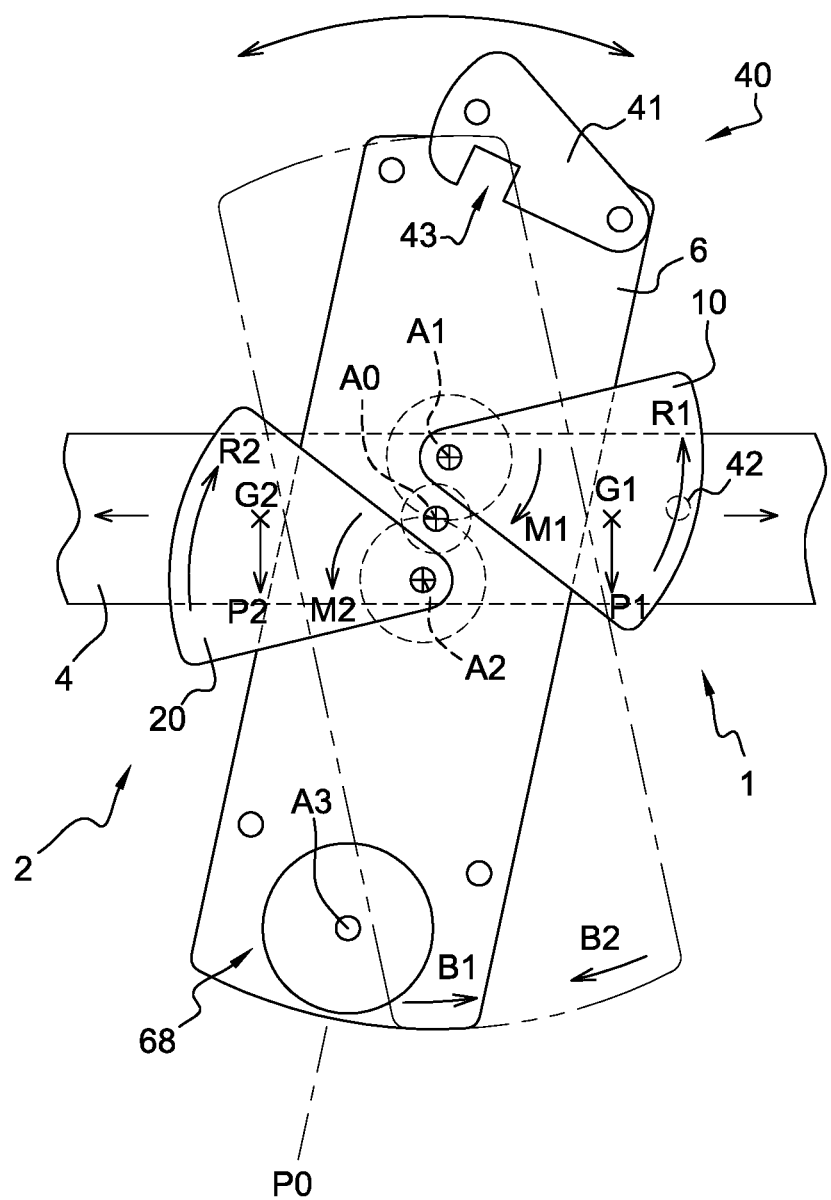
FIG. 2 is a partial front view of the mechanism, wherein the balance is shown inclined, while the eccentric elements are shown in lateral positions.
Figure 3:
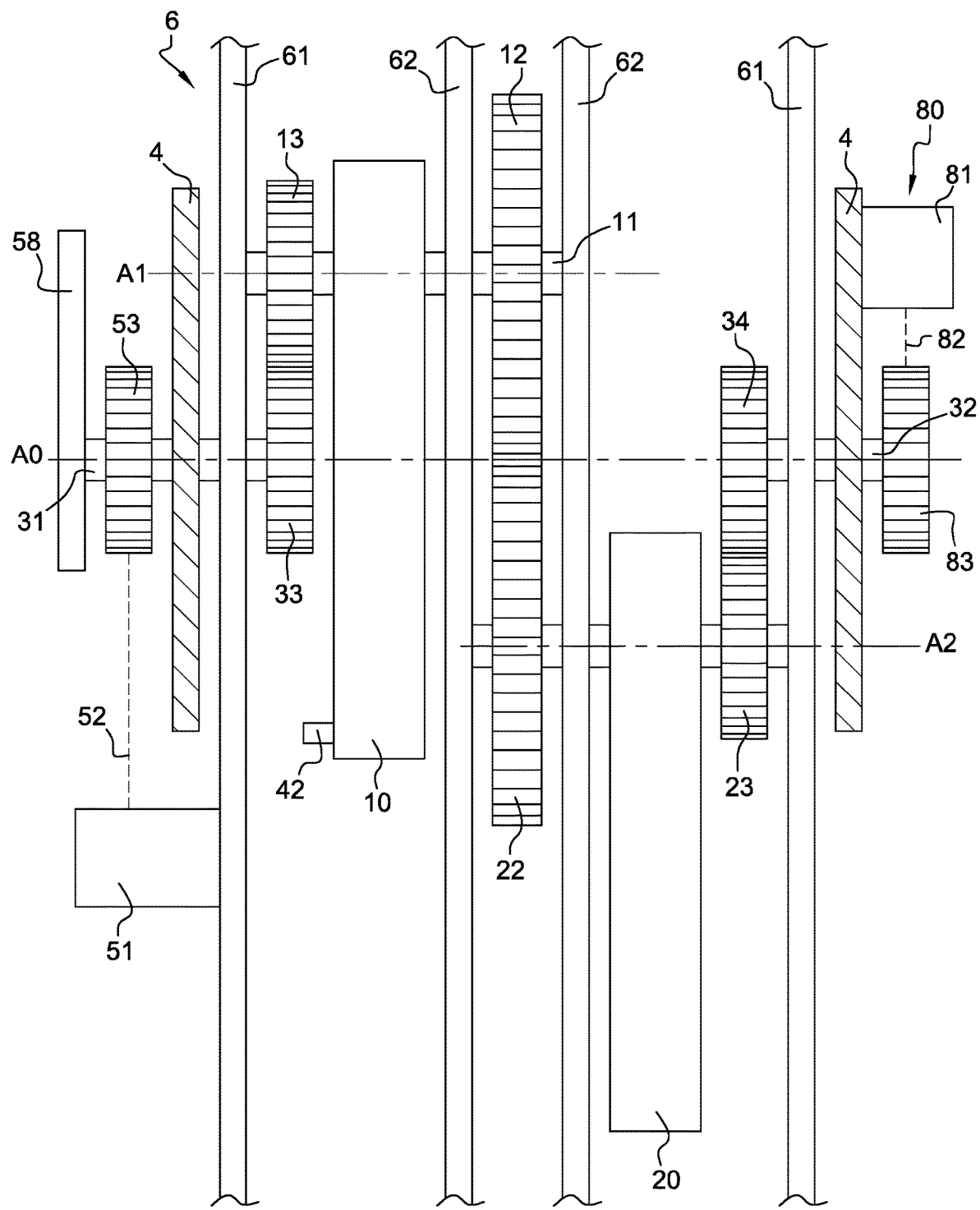
FIG. 3 is a section along the line III-III in FIG. 1 partially showing the mechanism in a larger scale.

A crossed-centrifugations mechanism 1 according to the invention is shown in FIGS. 1 to 3.

The mechanism 1 comprises a base 2, a pendulum 6, a synchronization system 8, and two eccentric elements 10 and 20.

The pendulum 6 is movable in rotation about a pendulum axis A0 integral to the base 2, while the eccentric elements 10 and 20 are movable in rotation about axes A1 and A2 integral to the pendulum 6. The axes A0, A1 and A2 are horizontal, parallel and arranged in the same plane P0 integral to the pendulum 6. The axis of rotation A1 of the element 10 is arranged above the axis A0, while the axis of rotation A2 of the element 20 is arranged below the axis A0. The axes A1 and A2 are equidistant from the axis A0.

The base 2 comprises four vertical posts 3, two horizontal posts 4, and horizontal reinforcements 5. Each horizontal post 4 is supported by means of two vertical posts 3, thus forming two post assemblies 3 and 4 arranged in parallel and connected by means of the horizontal reinforcements 5.

The pendulum 6 is positioned vertically within the intermediate space delimited by the posts 4 and the reinforcements 5. The pendulum 6 is mounted pivotally in relation to the base 2, more precisely by means of the posts 4, about the pendulum axis A0 integral to the posts 4.

The pendulum 6 comprises four metallic plates, namely two lateral plates 61 and two central plates 62, arranged parallel to one another and to the posts 4 The plates 61 and 62 are connected by means of four horizontal bars 63, arranged at the four corners of the pendulum 6.

As shown in FIG. 3, the pendulum axis A0 is embodied by two lateral shafts 31 and 32, each mounted pivotally through an upright 4 and a plate 61.

A counterweight 68 is attached to the lower part of the beam 6, on a horizontal axis A3 located in the plane P0, parallel to the axis A0, A1 and A2. The counterweight 68 amplifies the pivoting of the pendulum 6, alternating on one side then the other, as shown by the arrows B1 and B2 in FIG. 2.

The synchronization system 8 comprises various elements 11, 12, 13, 21, 22, 23, 31, 32, 33 and 34 coupled to each other, as shown in FIG. 3.

A first support shaft 11 is mounted pivotally on the pendulum 6, centered on the first axis A1 and integral to the first eccentric element 10, The shaft 11 is supported by a lateral plate 61 and the two central plates 62. A first central gearwheel 12 and a first intermediate gearwheel 13 are integral to the first support shaft 11.

A second support shaft 21 is mounted pivotally on the pendulum 6, centered on the second axis A2 and integral to the second eccentric element 20. The shaft 21 is supported by the other lateral plate 61 and the two central plates 62. A second central gearwheel 22 and a second intermediate gearwheel 23 are integral to the support shaft 21.

The gearwheels 12 and 22 have the same diameter and the same number of the teeth. In the same way, the gearwheels 13 and 23 have the same diameter and the same number of teeth. The gearwheels 12 and 22 have a diameter and a number of teeth double that of the gearwheels 13 and 23. For example, the gearwheels 12 and 22 have forty-eight teeth, while the gearwheels 13 and 23 have twenty-four teeth.

The lateral shafts 31 and 32 are centered on the pendulum axis A0. A first lateral gearwheel 33 is integral to the first lateral shaft 31. A second lateral gearwheel 34 is integral to the second lateral shaft 32.

The shafts 11, 21, 31, and 32 are supported by bearings, for example ball bearings, not shown for the purpose of simplification in FIGS. 1 and 3.

The gearwheels 12 and 22 are positioned between the two central plates 62 and mesh with each other. The gearwheels 13 and 33 are positioned with the element 10 between two plates 61 and 62, and mesh with each other. The gearwheels 23 and 34 are positioned with the element 20 between the two other plates 61 and 62, and mesh with each other.

By virtue of a synchronization system 8, a synchronous movement can be transmitted from the shaft 31 to the shaft 32, by means of the shafts 11 and 21. In practice, the shafts 11 and 21 turn at the same speed, but in opposite directions of rotation R1 and R2.

Thus, the synchronization system 8 enables to drive the first eccentric element 10 and the second eccentric element 20 in a synchronized counter-rotating rotational movement R1/R2.

By way of example, when the mechanism 1 is in operation, the rotational speed R1/R2 may be of the order of 500 revolutions per minute.

The eccentric elements 10 and 20 have special shapes that are designed to generate centrifugal forces. By way of example, the elements 10 and 20 each weigh 50 kg, while the counterweight 68 weighs 60 kg. Preferably, the mass of the elements 10 and 20 is equal to the mass of the counterweight 68. For example, the elements 10 and 20 each weigh 50 kg, while the counterweight 68 weighs 100 kg.

The element 10 has a center of gravity G1 that is eccentric in relation to the axis A1 and is movable in rotation R1 about said axis A1. The element 10 generates a moment M1 of gravitational force P1 about the axis A1.

The element 20 has a center of gravity G2 that is eccentric in relation to the axis A2 and is movable in rotation R2 about said axis A2. The element 20 generates a moment M2 of gravitational force P2 about the axis A2.

The crossed-centrifugations are described in more detail below with reference to FIGS. 5 to 12.

The energy generated by centrifugation within the mechanism 1 is recoverable by coupling an energy recovery system 80 to the synchronization system 8.

In FIG. 3, the energy recovery system 80 is coupled to the synchronization system by means of the shaft 32.

The system 80 comprises a generator 81, a notched chain 82 and a gearwheel 83 attached to the shaft 32. The generator 81 is shown attached to a post 4 for simplification purposes, but may be positioned at any other suitable location. The chain 82 is indicated by a dotted line for the sake of simplification. The chain 82 connects the gearwheel 83 to the generator 81.

The method of implementation of the mechanism 1 comprises a startup step, an operating step, and if necessary, during the operating phase, restarting steps.

The startup step consists in imparting the synchronized counter-rotating movement of rotation R1/R2 to the eccentric elements 10 and 20. Various starting means are described below.

During the operating phase, the eccentric elements 10 and 20 are movable in synchronized counter-rotating rotation R1/R2, with crossed-centrifugations. The pendulum 6 alternately pivots B1/B2 on one side then the other, amplifying the movement of the eccentric elements 10 and 20, by means of simultaneous crossed-thrusts of the pendulum 6 against the axis A1 and A2, and by the transmission of torque to the gearwheels 13 and 23. The energy recovery system 80 coupled to the synchronization system 8 recovers energy generated by centrifugation within the mechanism 1.

The restarting steps consist in imparting new momentum to the eccentric elements 10 and 20 within the counter-rotating rotational movement R1/R2 thereof.

Within the scope of the invention, the energy recovered by the energy recovery system 80 is greater than the energy expended during the startup step and the restarting steps.

The startup step can be performed by means of gravity, releasing the eccentric elements 10 and 20 arranged at the high position.

For this purpose, the mechanism 1 can comprise a locking system 40, operated between a configuration for locking the eccentric elements 10 and 20 in the high position, and a configuration for releasing the eccentric elements 10 and 20. In the locking configuration, the system 40 prevents the elements 10 and 20 from describing the synchronized counter-rotating rotational movement R1/R2. In the releasing configuration, the system 40 releases the elements 10 and 20 which can then describe the synchronized counter-rotating rotational movement R1/R2.

In the example shown in FIGS. 1 to 3, the system 40 comprises a pivoting hook 41 mounted on the pendulum 6 and an attachment member 42 integral to the element 10, wherein the axis A1 is situated above the axes A0 and A2. The hook 41 has a notch 43, within which the member 42 lodges when the element 10 is in the high position.

The pivoting of the hook 41 between the locking and releasing configurations can be controlled by any suitable means, not shown for the purpose of simplification. The hook 41 is raised in order to release the member 42 from the notch 43, thereby allowing the rotation R1/R2 of the elements 10 and 20. The hook 41 is lowered in order to retain the member 42 within the housing 43 when the element 10 passes to the high position, thus arresting the rotation of the element 10 and therefore also that of the element 20.

According to a variation, the startup step is performed using a crank 58 coupled to the synchronization system 8. In the example of FIG. 3, said crank 58 is mounted on the shaft 31. The crank 58 can particularly be used when the elements 10 and 20 start in the low position.

According to another variation, the startup step can be performed using a drive-motor 51 coupled to the synchronization system 8. In the example of FIG. 3, the motor 51 is coupled by means of a toothed chain 52 to a gearwheel 53 mounted on the shaft 31. For the purposes of simplification the motor 51 is shown attached to a post 4, but may be positioned at any other suitable location. For the sake of simplification the chain 52 is indicated by a dotted line. In an advantageous manner, the motor 51 can also be used for the restarting steps.

According to other particular variants of the mechanism 1, performing the startup step by simply pushing against one of the eccentric elements 10 and 20 may be envisaged.

Figure 4:
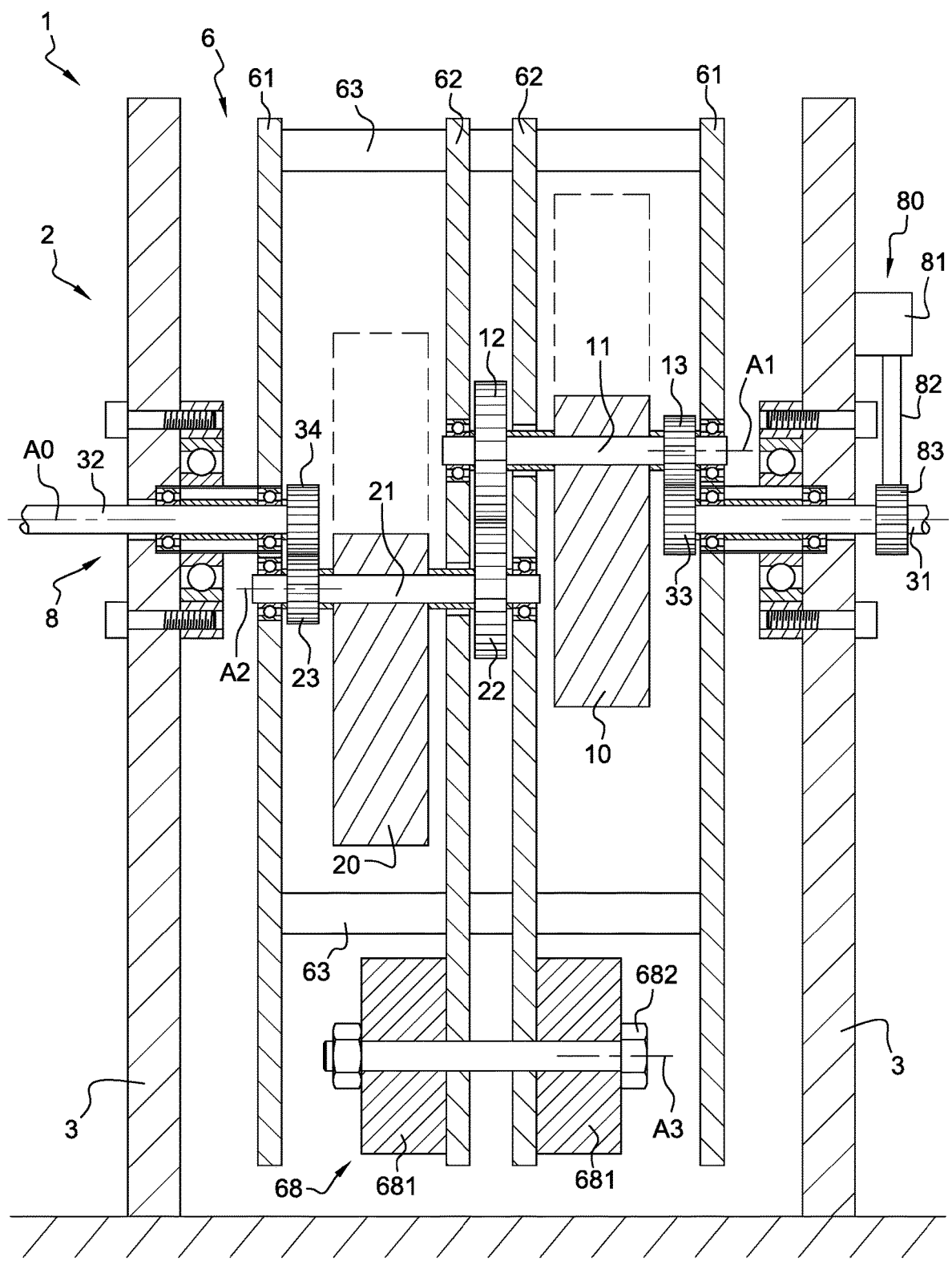
FIG. 4 is a section along the line IV-IV in FIG. 1 showing a mechanism according to a second embodiment of the invention.

A mechanism 1 according to a second embodiment of the invention is shown in FIG. 4.

The base 2 has vertical posts 3 supporting the axes 31 and 32 in rotation about the pendulum axis A0. The energy recovery system 80 comprises a motor-generator 81, suitable for fulfilling the function of both motor and generator. Thus, the motor-generator 81 can also be used for the startup step and/or the restarting steps of the mechanism 1.

The counterweight 68 comprises two weights 681 positioned against the outer face of the central plate 62, as well as a screw-nut assembly 682 for fixing the weights 681 in position. The screw-nut assembly 682 passes through the plates 62 and the weights 682 along the axis A3 parallel to the axes A0, A1 and A2.

Except for these differences, the operation of the mechanism 1 in FIG. 4 is similar to the operation of the mechanism 1 in FIGS. 1 to 3.

In FIGS. 5 to 12 the different operating steps of the mechanism 1 of FIGS. 1 to 3 are shown.

In this example, as shown in FIG. 5, the elements 10 and 20 are initially in the high position. FIGS. 6 to 8 show the descent of the elements 10 and 20. FIG. 9 shows the elements 10 and 20 in the low position. FIGS. 10 to 11 show the ascent of the elements 10 and 20. The rotations R1 and R2 are counter-rotating. The elements 10 and 20 intersect at the high and low positions.

The element 10 is subjected to a gravitational force P1 exerted at the center of gravity G1 thereof. The element 20 is subjected to a gravitational force P2 exerted at the center of gravity G2 thereof. The counterweight 68 is subjected to a gravitational force P3 exerted upon the axis A3.

FIGS. 5 and 6 show the starting of the mechanism 1, when the elements 10 and 20 are initially at the high position. In this example, the element 10 starts the rotational movement R1 thereof to the left while the element 20 begins the rotational movement R2 thereof to the right. Given that the center of gravity G1 of the element 10 is further from the pendulum axis A0 than the center of gravity G2 of the element 20, the counterweight 68 is driven pivotally B1 to the right.

FIG. 6 shows the mechanism 1 during the pivoting B1 and at the beginning of the descent. At this instant, given the respective positions of the pendulum 6 and the elements 10 and 20, the potential energy of the element 10 is greater than the potential energy of the element 20.

The pivoting B1 simultaneously pushes against the axis A1 to the left and the axis A2 to the right. This increases the distance traveled by the center of gravity G1, and therefore increases the kinetic energy of the element 10. On the other hand, this reduces the distance traveled by the center of gravity G2, and therefore reduces the kinetic energy of the element 20. The pendulum 6 transmits the centrifugal energy to the elements 10 and 20 by means of the pivoting B1, in addition to the centrifugal energy thereof by means of the rotation R1/R2.

Also, the pivoting B1 produces effects at the meshing of the gearwheels 13 and 33 and at the meshing of the gearwheels 23 and 34. More specifically, the pendulum 6 transmits positive torque to the gearwheels 13 and 33, and negative torque to the gearwheels 23 and 34. This further increases the kinetic energy of the element 10, and further reduces the kinetic energy of the element 20.

Insofar as the potential and kinetic energies thereof are greater, the element 10 has a predominant influence within the mechanism 1. Note that because of the synchronization system 8, the rotational speeds R1 and R2 must be equal. Thus, the pivoting B1 increases the acceleration of the rotation movements R1 and R2.

FIG. 7 shows the first moment in time when the centers of gravity G1 and G2 are equidistant from the pendulum axis A0. The pivoting of the pendulum 6 is about to reverse. At this instant, the elements 10 and 20 have the same potential energy.

FIGS. 8 to 10 show the end of the descent and the start of the ascent of the elements 10 and 20. Given that the center of gravity G2 of the element 20 is farther from the pendulum axis A0 than the center of gravity G1 of the element 10, the counterweight 68 is driven pivoting B2 to the left.

Given the respective positions of the pendulum 6 and the elements 10 and 20, the potential energy of the element 20 is greater than the potential energy of the element 10.

The pivoting B2 simultaneously pushes against the axis A1 to the right and the axis A2 to the left. This reduces the distance traveled by the center of gravity G1, and therefore reduces the kinetic energy of the element 10. On the other hand, this increases the distance traveled by the center of gravity G2, and therefore increases the kinetic energy of the element 20.

Also, the pivoting B2 produces effects at the meshing of the gearwheels 13 and 33 and at the meshing of the gearwheels 23 and 34. More specifically, the pendulum 6 transmits negative torque to the gearwheels 13 and 33, and positive torque to the gearwheels 23 and 34. This further increases the kinetic energy of the element 20, and further reduces the kinetic energy of the element 10.

Insofar as the potential and kinetic energies thereof are greater, the element 20 has a predominant influence within the mechanism 1. Thus, the pivoting B2 increases the acceleration of the rotations R1/R2 during the descent of the elements 10 and 20, and then attenuates the deceleration of the rotations R1/R2 during the ascent of the elements 10 and 20. The pendulum 6 transmits centrifugal energy to the elements 10 and 20 by means of the pivoting B2, in addition to the centrifugal energy thereof by means of the rotation R1/R2. FIG. 11 shows the second moment when the centers of gravity G1 and G2 are equidistant from the pendulum axis A0. The pivoting of the pendulum 6 is about to reverse. At this instant, the elements 10 and 20 have the same potential energy.

FIG. 12 together with FIGS. 5 and 6 show the end of the descent and the start of the ascent of the elements 10 and 20. Given that the center of gravity G1 of the element 10 is further from the pendulum axis A0 than the center of gravity G2 of the element 20, the counterweight 68 is driven pivotally B1 to the right. During the ascent of the elements 10 and 20 the pivoting B1 attenuates the deceleration of the rotations R1/R2.

During the operation of the mechanism 1, maximum centrifugal energy is generated during the descent of the elements 10 and 20, as shown in FIGS. 5 to 9. When the moments M1/M2 are in the same direction as the rotations R1/R2 said moments M1/M2 accelerate the rotations R1/R2.

The alternating pivoting B1/B2 of the pendulum 6 accompanies the elements 10 and 20 during the synchronized counter-rotating rotational movement R1/R2 thereof. More precisely, the pivoting R1/R2 amplifies the rotational movement R1/R2 of the elements 10 and 20, by means of simultaneous crossed-thrusts against the axes A1 and A2 thereof, and by means of the transmission of torque to the system 8. The pivoting B1/B2 increases the acceleration of the rotations R1/R2 during the descent of the elements 10 and 20, and then attenuates the deceleration of the rotations R1/R2 during the ascent of the elements 10 and 20. The pendulum 6 transmits centrifugal energy to the elements 10 and 20 by means of the pivoting B1/B2, in addition to the centrifugal energy thereof by means of the rotation R1/R2. The torque transmitted to the system 8 propels the elements 10 and 20, downwards accelerating them, then upwards in opposing the gravitational forces P1/P2.

In practice, six centrifugations can be distinguished for each 360° revolution of the eccentric elements 10 and 20:
- a first centrifugation, so-called vertical, due to the descent of the eccentric elements 10 and 20;
- a second centrifugation, so-called horizontal, due to the pivoting B1 of the pendulum 6 on a first side, pushing against the first axis A1;
- a third centrifugation, so-called horizontal, due to the pivoting B1 of the pendulum 6 on said first side, pushing against the second axis A2;
- a fourth centrifugation, so-called vertical, due to the descent of the eccentric elements 10 and 20;
- a fifth centrifugation, so-called horizontal, due to the pivoting B2 of the pendulum 6 on a second side, pushing against the first axis A1 in the opposite direction to the second centrifugation; and
- a sixth centrifugation, so-called horizontal, due to the pivoting B2 of the pendulum 6 on said second side, pushing against the second axis A2 in the opposite direction to the second centrifugation.

The second and third centrifugations are simultaneous at the end of the first centrifugation and at the start of the fourth centrifugation, while the fifth and sixth centrifugations are simultaneous at the end of the fourth centrifugation and at the start of the first centrifugation.

When the mechanism 1 is operating at a rotational speed R1/R2 equal to 500 revolutions per minute, this results in 3000 centrifugations per minute.

Figure 13:
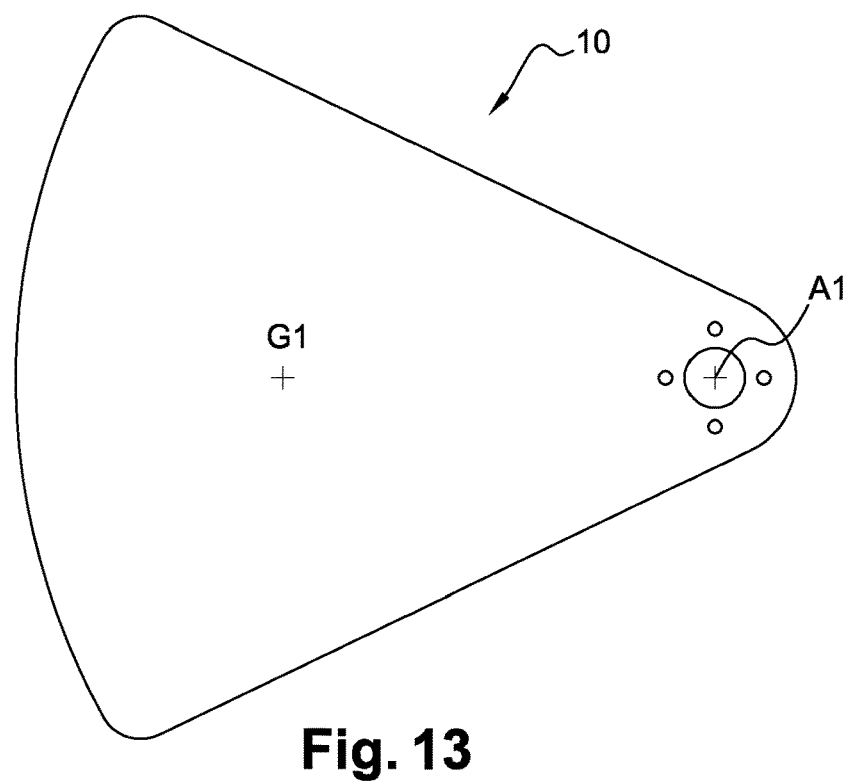
FIGS. 13 and 14 show, in front views, two variants of the eccentric elements that are intended to equip the mechanism according to the invention.
Figure 14:
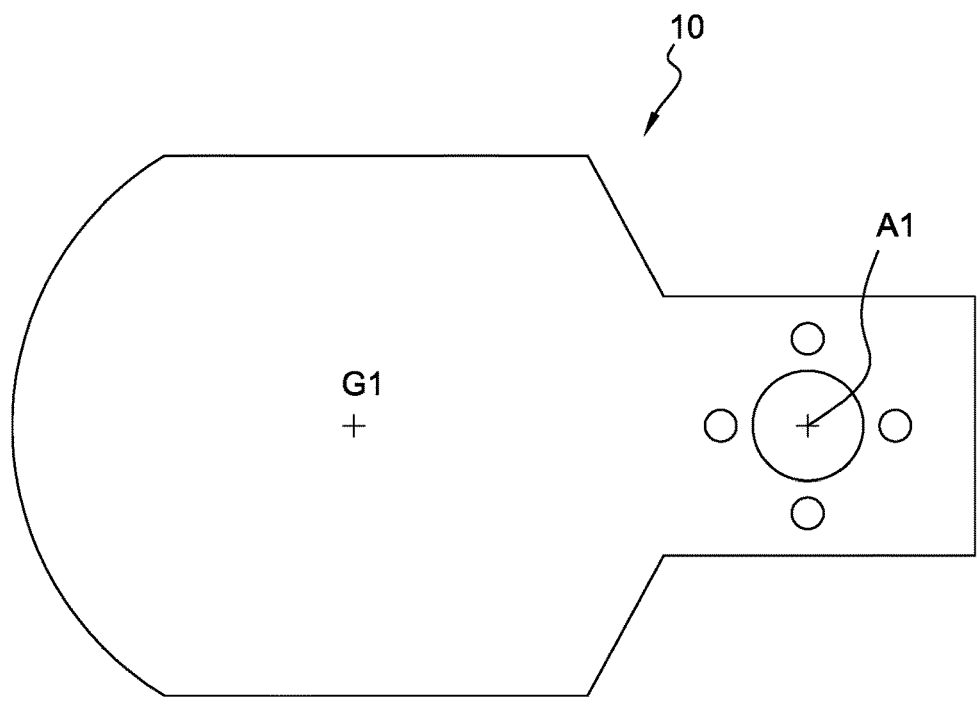

FIGS. 13 and 14 show, as front views, two variants of the eccentric elements 10 intended to equip the mechanism 1 according to the invention.

Said eccentric elements 10 and 20 have a generally increasing cross-section as the distance from the axis A1 increases, in such a way as to distance the center of gravity G1 with respect to the axis A1, and thus increase the centrifugal energy generated during the rotation R1. These forms offer a good compromise between mechanical strength, functionality in movement and centrifugal energy performance.

The elements 10 and 20 can have other forms without going beyond the scope of the invention.

Figure 15:
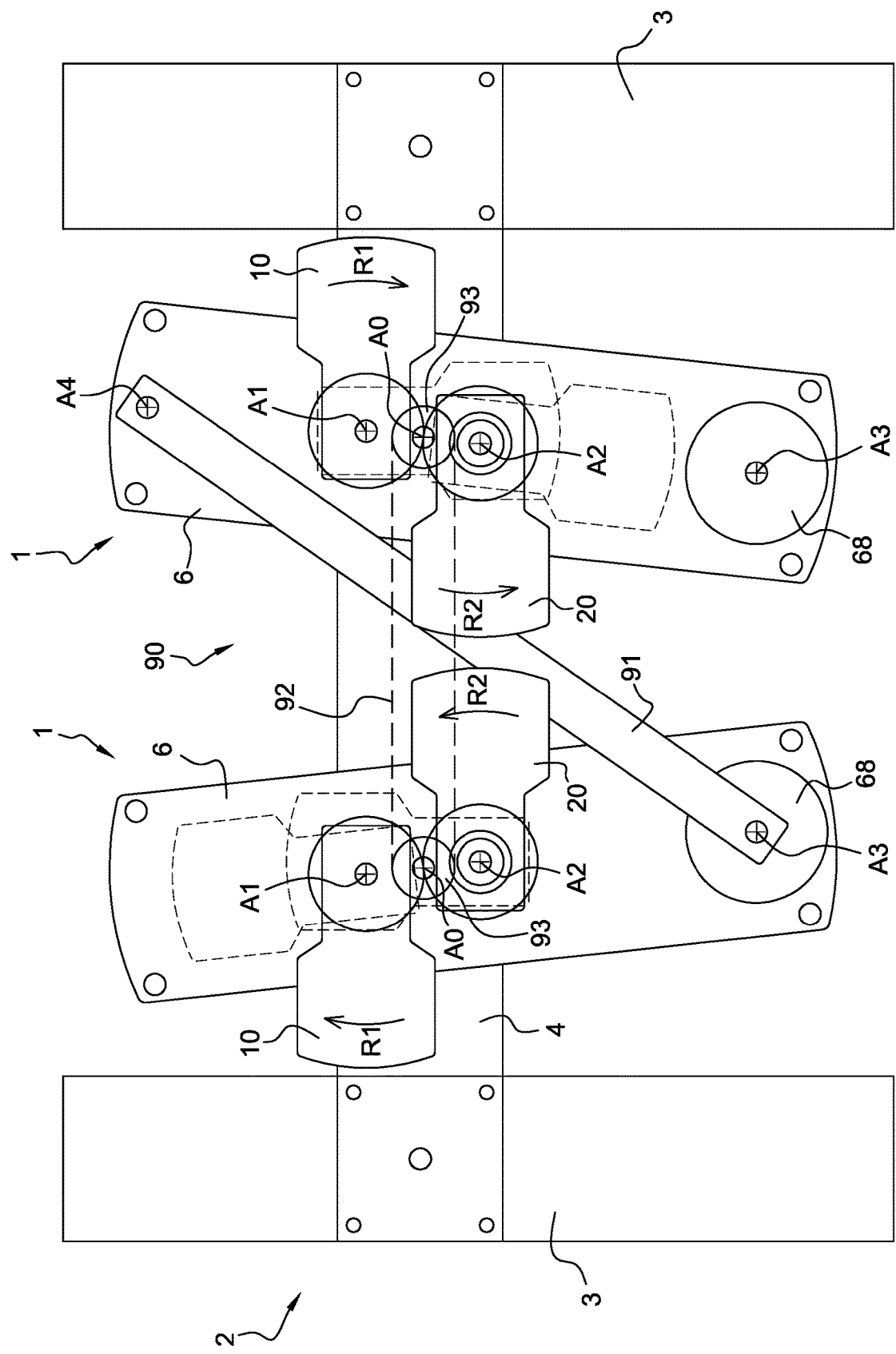
FIG. 15 is a front view of a machine according to the invention, comprising two mechanisms coupled in series by a chain and a connecting rod.

A machine according to the invention is shown in FIG. 15, comprising two mechanisms 1, such as that described above, coupled together in series.

The mechanisms 1 each comprise a pendulum 6, and share the same base 2 supporting the two pendulums 6. The mechanisms 1 have eccentric elements 10 and 20 according to FIG. 14.

The mechanisms 1 are coupled by means of a coupling system 90 comprising a connecting rod 91, a toothed chain 92 and two gearwheels 93.

The connecting rod 91 is articulated onto a mechanism 1 at the axis A3 of the counterweight 68 at the bottom, and at the other mechanism 1 at an axis A4 located at the top, at the same distance from the axis A0 as the axis A3 at the bottom.

The chain 92 extends between two gearwheels arranged vis-à-vis. For each mechanism 1, the gearwheel 93 can be mounted on the shaft 31 or 32, or possibly on the shaft 11 or 21.

When the machine is in operation, the pendulums 6 follow the counter-rotating oscillatory movements B1/B2. The upper parts thereof come together when the lower parts thereof are moving away from each other, and vice versa.

Furthermore, the elements 10 and 20 of one mechanism 1 intersect at the high position when the elements 10 and 20 of the other mechanism 1 intersect at the low position. In other words, the elements 10 and 20 of one mechanism 1 are arranged in phase opposition with respect to the elements 10 and 20 of the other mechanism 1. Thus, when the elements 10 and 20 of one mechanism 1 descend and generate maximum centrifugal energy, the elements 10 and 20 of the other mechanism 1 are ascending. In other words, the ascent of the elements 10 and 20 of one mechanism 1 is always facilitated by the descent of the elements 10 and 20 of the other mechanism 1. The starting of the machine is facilitated, and the recovery of centrifugal energy is further improved.

All of the moving parts of the oscillatory mechanisms 1 are counter-rotating. The two pendulums 6 are coupled counter-rotating, with two oscillations for each revolution. Thus, a rotational speed of 500 revolutions/minute is equivalent to 1000 oscillations/minute.

Figure 16:
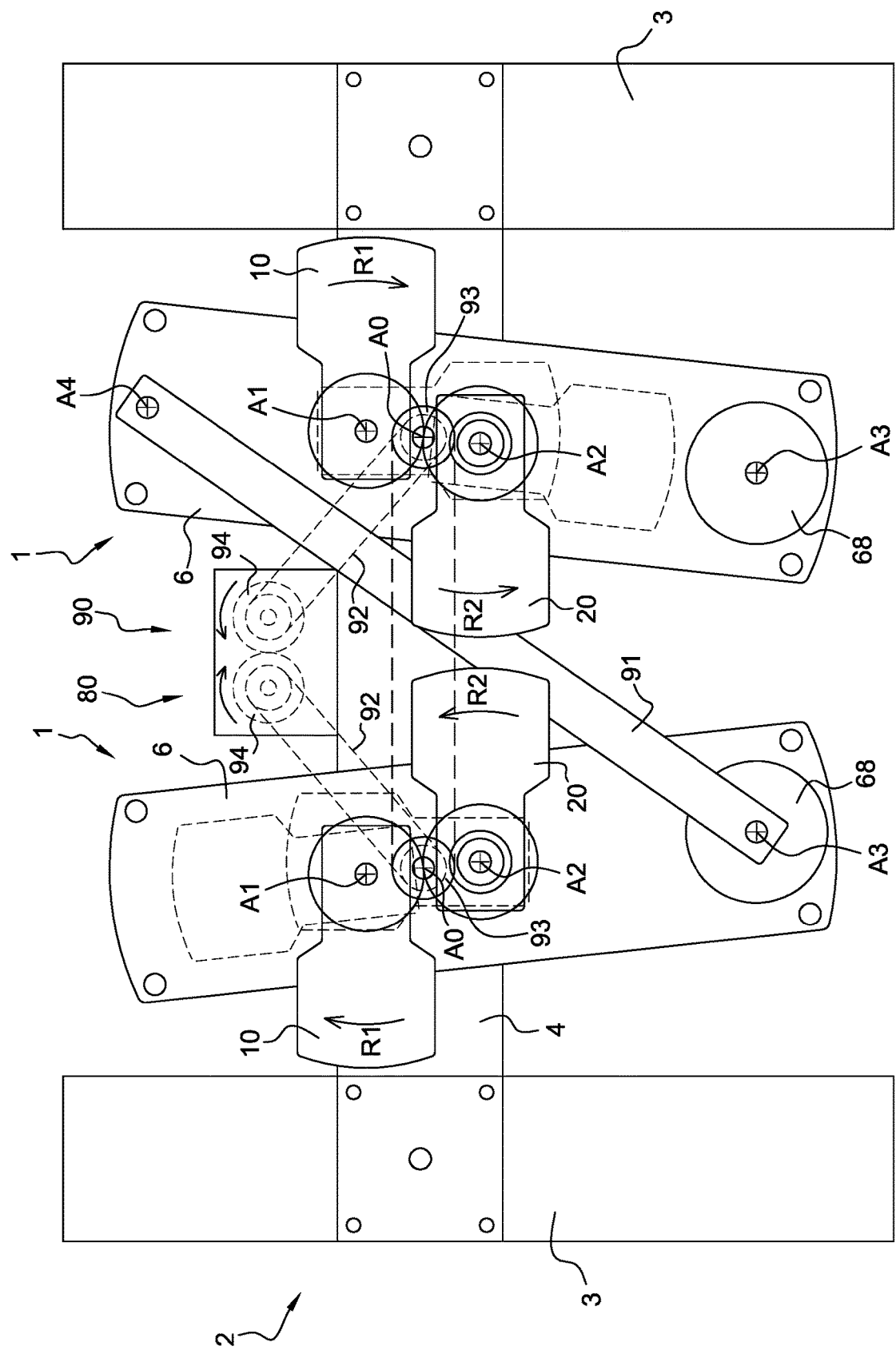
FIG. 16 is a view, similar to FIG. 15, of a machine according to another embodiment of the invention, comprising two mechanisms coupled in series to another coupling system.

Another machine according to the invention is shown in FIG. 16, comprising two mechanisms 1, such as that described above, coupled in series.

The coupling system 90 of the mechanisms 1 comprises a connecting rod 91, two toothed chains 92, two gearwheels 93 and two gearwheels 94. The system 90 comprises a chain 92, a gearwheel 93 and a gearwheel 94 for each mechanism 1.

The connecting rod 91 is articulated on one mechanism 1 at an axis A4 located at the top, and on the other mechanism 1 at the axis A3 at the bottom.

Each chain 92 extends between a gearwheel 93 mounted on the pendulum 6, more precisely on the shaft 11, 21, 31 or 32, and a gearwheel 94 mounted on the base 2, more precisely on a horizontal post 4.

The energy recovery system 80 may comprise a motor-generator, coupled to the axis supporting one of the gearwheels 94.

Alternatively, the system 80 may comprise a generator coupled to an axis supporting one of the gearwheels 94, while a motor is coupled to the other axis supporting the other gearwheel 94.

Furthermore, the mechanism 1 or the machine comprising at least one mechanism 1 may conform differently to FIGS. 1 to 16 without departing from the scope of the invention.

According to an example of a variant, not shown, the mechanism 1 may comprise eccentric elements 10 and 20 in the shape of wind turbine blades. The centrifugal energy and wind energy combine when the mechanism 1 is in operation. The windage of the elements 10 and 20 may advantageously be used for the startup step and/or the restarting steps of the mechanism 1.

According to another variant, not shown, the mechanism 1 can be devoid of a counterweight 68. This variant may in particular be of interest for the balanced mechanisms 1, insofar as it enables to gain speed and increase the kinetic energy of the mechanisms 1.

Additionally, the technical characteristics of the various embodiments and variants mentioned above can be, in whole or for some of them, combined with each other. Thus, the mechanism 1 and the machine may be adapted in terms of cost, functionality and performance.

The invention claimed is:

1. A Mechanism, comprising:
   a base;
   a pendulum mounted pivotally in relation to the base about a pendulum axis;
   a first eccentric element generating a first moment of gravitational force about a first axis;
   a second eccentric element generating a second moment of gravitational force about a second axis; and
   a synchronization system for synchronizing the first eccentric element and the second eccentric element according to a synchronized counter-rotating rotational movement.
   wherein:
   the pendulum axis and the axes of the eccentric elements are parallel and arranged in a same plane integral to the pendulum;
   the axes of the eccentric elements are supported by the pendulum, respectively above and below the pendulum axis; and
   when the mechanism is in operation:
      the eccentric elements are movable in synchronized counter-rotating rotation, with cross-centrifugations,
      the pendulum pivots alternately on one side then the other, amplifying the rotational movement of the eccentric elements, by means of simultaneous cross-thrusts of the pendulum against the axes of said eccentric elements, and by the transmission of torque to the synchronization system, and
      energy transmitted by the mechanism is recoverable by coupling an energy recovery system to the synchronization system.

2. The Mechanism according to claim 1, wherein the axes of the eccentric elements are positioned equidistant from the pendulum axis.

3. The Mechanism according to claim 1, wherein the eccentric elements have a generally increasing cross-section as the distance from the axis of rotation increases.

4. The Mechanism according to claim 1, wherein the eccentric elements are arranged such that when the mechanism is in operation, the eccentric elements intersect at a high position and at a low position.

5. The Mechanism according to claim 1, wherein the eccentric elements are arranged such that when the mechanism is in operation, the eccentric elements intersect at a left lateral position and at a right lateral position.

6. The Mechanism according to claim 1, wherein a counterweight is attached at the lower part of the pendulum and amplifies the alternate pivoting thereof on one side then on the other, which amplifies the simultaneous cross-thrusts of the pendulum against the axes of the eccentric elements and the transmission of torque to the synchronization system.

7. The Mechanism according to claim 1, wherein the mechanism comprises a locking system operable between:
   a configuration for locking the eccentric elements in the high position, preventing them from describing the synchronized counter-rotating rotational movement; and
   a configuration for releasing the eccentric elements, allowing them to describe the synchronized counter-rotating rotational movement.

8. The Mechanism according to claim 7, wherein the locking system comprises a pivoting hook mounted on the pendulum and a hooking element integral to one of the eccentric elements.

9. The Mechanism according to claim 1, wherein the synchronization system comprises gearwheels.

10. The Mechanism according to claim 1, wherein the synchronization system comprises:
- a first support shaft mounted pivotally on the pendulum, centered on the first axis and integral to the first eccentric element,
- a second support shaft mounted pivotally on the pendulum, centered on the second axis and integral to the second eccentric element,
- a first central gearwheel and a first intermediate gearwheel integral to the first support shaft, the first central gearwheel having a diameter and a number of teeth double that of the first intermediate gearwheel,
- a second central gearwheel and a second intermediate gearwheel integral to the second support shaft, the second central gearwheel meshing with the first central gearwheel, the second central gearwheel having a diameter and number of teeth equal to that of the first central gearwheel and double that of the second intermediate gearwheel,
- a first lateral shaft and a second lateral shaft centered on the pendulum axis,
- a first lateral gearwheel integral to the first lateral shaft and meshing with the first intermediate gearwheel,
- a second lateral gearwheel integral to the second lateral shaft and meshing with the second intermediate gearwheel,
- where either the first lateral shaft or the second lateral shaft is intended to be coupled to the energy recovery system.

11. The Mechanism according to claim 9, wherein during one 360° rotation of the eccentric elements, between two oscillations of the pendulum, the gearwheels receive the torque captured between the thrusts of the pendulum and the rotation of the eccentric elements, the torque propelling the eccentric elements downwards accelerating them, then upwards in opposing the gravitational forces.

12. The Mechanism according to claim 1, wherein the counter-rotating elements have the same mass and the same dimensions.

13. A Machine, comprising:
- at least one mechanism according to claim 1, and
- an energy recovery system coupled to a synchronization system.

14. The Machine according to claim 13, wherein the machine comprises at least one pair of mechanisms coupled together in parallel or series, wherein the pendulums alternately pivot in a counter-rotating manner.

15. A Method for implementing a mechanism according to 12, wherein the method comprises:
- a startup step, for imparting a synchronized counter-rotating rotational movement to the eccentric elements;
- an operating phase, during which:
  - the eccentric elements are movable in synchronized counter-rotating rotation, with cross-centrifugations,
  - the pendulum pivots alternately on one side then the other, amplifying the rotational movement of the eccentric elements, by means of simultaneous cross-thrusts of the pendulum against the axes of said eccentric elements, and by the transmission of torque to the synchronization system, and
- an energy recovery system coupled to the synchronization system recovers energy transmitted by the mechanism; and
- if necessary during the operating phase, restarting steps consisting in imparting new momentum to the eccentric elements within the counter-rotating rotational movement thereof.

* * * * *